United States Patent [19]

Derman

[11] Patent Number: 4,856,304
[45] Date of Patent: Aug. 15, 1989

[54] SECURITY DEVICE FOR CASSETTE TAPE DECKS OR THE LIKE

[76] Inventor: Jay S. Derman, 4141 Dixie Canyon Ave., Sherman Oaks, Calif. 91423

[21] Appl. No.: 328,042

[22] Filed: Mar. 23, 1989

[51] Int. Cl.$^4$ ............................................. E05B 73/00
[52] U.S. Cl. ............................................ 70/14; 70/58
[58] Field of Search ................... 70/14, 57, 58, 258, 70/163–173; 360/37

[56] References Cited

U.S. PATENT DOCUMENTS

| | | | |
|---|---|---|---|
| 4,131,001 | 12/1978 | Gotto | 70/14 |
| 4,462,233 | 7/1984 | Horetzke | 70/14 |
| 4,616,490 | 10/1986 | Robbins | 70/14 |
| 4,640,106 | 2/1987 | Derman | 70/14 |
| 4,655,057 | 4/1987 | Derman | 70/14 |
| 4,685,312 | 8/1987 | Lakoski | 70/14 |
| 4,741,185 | 5/1988 | Weinert | 70/57 |

Primary Examiner—Robert L. Wolfe
Attorney, Agent, or Firm—Monty Koslover Assoc.

[57] ABSTRACT

A security device for preventing the unauthorized use of a cassette tape deck installed in automobiles, or for locking CD players or computer disk drives. The invention is simple in conception and is made of only two asesmblies. One assembly is a transverse block made of rigid plastic, having a readward member projecting from its back surface and incorporating a cylindrical lock. The other assembly is a "T" shaped tongue piece made of stainless steel. The tongue piece is inserted in a horizontal slot cut in the transverse block, and the top of the "T" plus the rearward projecting member is then inserted in the cassette chamber opening. When pulled through by hand, a projecting ridge on the tongue piece hooks on to and bears against the inside surface edge of the cassette chamber opening. Rotating the cylindrical lock with a key causes a key element to engage one of a number of slots that are cut in the tongue piece. The tongue piece and the transverse block are thus locked in place and cannot be removed from the equipment without causing damage to it.

An alternative embodiment does not incorporate a cylindrical lock, but rather uses an external padlock that is attached to the tongue piece through one of a number of 400. holes drilled in it.

9 Claims, 2 Drawing Sheets

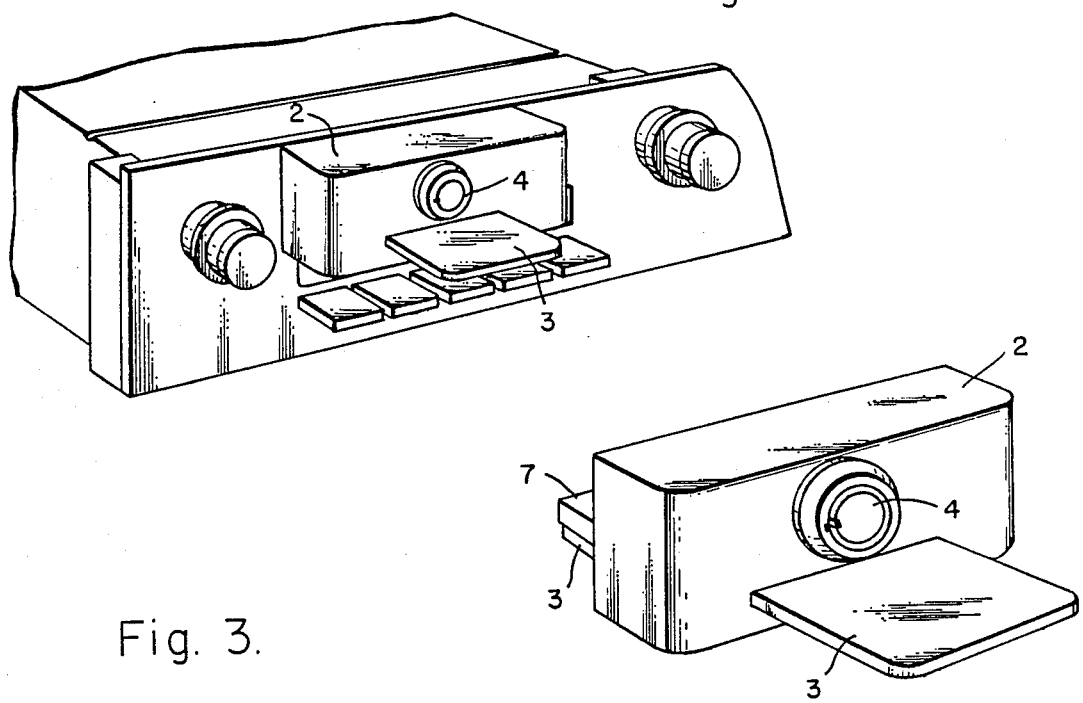
Fig. 1.
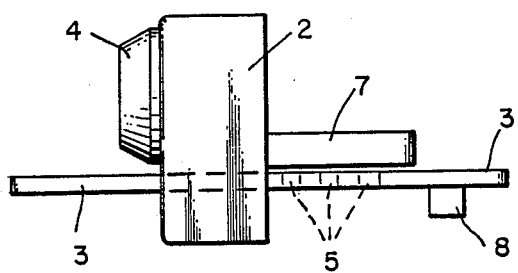
Fig. 2.
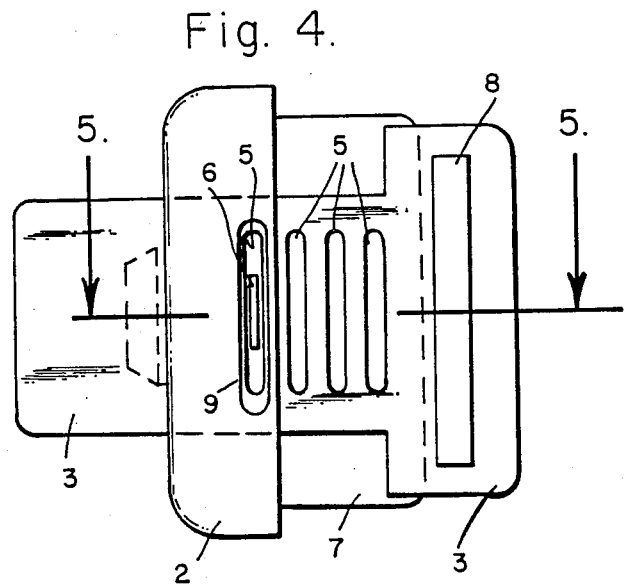
Fig. 3.
Fig. 4.
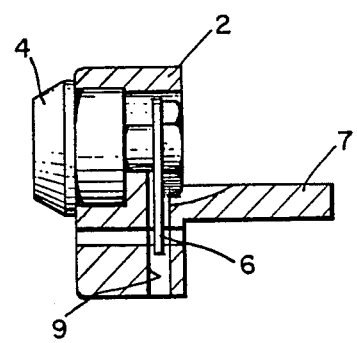
Fig. 5.

SECURITY DEVICE FOR CASSETTE TAPE DECKS OR THE LIKE

BACKGROUND OF THE INVENTION

Cassette tape decks are commonly used in automobiles. While in automobiles, they are subject to theft or to misuse. The tape deck, or similar equipment, is operable by inserting a cassette or CD or floppy disk into the receiving chamber through an opening. Providing the electric power is connected, there is nothing to stop any person from operating the equipment.

Cassette tape decks and similar equipment are portable and usually easily removed from their mountings. They are thus relatively easy to steal and resell. If an installed device prevented easy use of the equipment without damage, it could act as a deterrent to theft.

A number of cassette tape deck locking devices and similar devices have been invented and are available. Among these are U.S. Pat. No. 4,655,057 by Jay S. Derman, U.S. Pat. No. 4,640,106 by Jay S. Derman and U.S. Pat. No. 4,131,001 by Raymond J. Gotto. U.S. Pat. No. 4,655,057 utilizes a member to cover the cassette chamber opening and has inward projecting arms that impinge on the opened chamber door, securing the device in a blocking position. Rotating a built-in lock element by means of a key, unlocks the device by lifting the door from its engagement with the projecting arms. U.S. Pat. No. 4,640,106 utilizes a member to cover the cassette chamber opening and a "U" shaped body bolt together with a threaded rod for insertion in the cassette chamber. The threaded rod is rotated by a cylinder lock and an adjustable position lock element is moved to block removal of the locking device from the chamber.

U.S. Pat. No. 4,131,001 utilizes a cassette-shaped part for insertion in the cassette chamber opening. By means of gears that are connected to a lock cylinder, projecting arms and locking members are moved to impinge against the inside chamber surfaces preventing removal of the locking device.

The first discussed device, U.S. Pat. No. 4,655,057 is relatively simple in construction. It depends entirely on interaction with the cassette chamber door, which prevents the device from being withdrawn unless it is unlocked. It requires the use of a built-in cylinder lock to rotate the unlocking device. An external padlock cannot be used in its place.

The remaining two devices are both relatively complex in concept and in construction. As for the first device, both require the use of a built-in cylinder lock to both lock and unlock the device. An external padlock cannot be used.

Other proposed locking devices utilize housings for enclosing the cassette tape deck or similar equipment, providing a concealed limited access keyway for locking the equipment to the automobile dashboard or cabinet.

SUMMARY OF THE INVENTION

The present invention relates to a device for preventing the unauthorized use of a cassette tape deck, CD player or similar equipment, and discouraging its theft. The invention comprises a transverse block assemby and a "T" shaped member tongue piece. The tongue piece is inserted in a slot in the block assembly and the "T" bar end of the tongue piece is inserted in the cassette door opening. A projection on the tongue piece catches on the inside surface of the cassette opening. The block assembly is then pushed against the outside surface of the equipment and the tongue piece is pulled through hard against the inside tape deck surface, being held horizontally by a rearward bearing surface that projects from the block assembly. The rearward bearing surface and the tongue piece thickness, together occupy the equivalent thickness of a cassette and fill the cassette opening in the tape deck. Thus, neither the tongue piece nor the block can be removed from the equipment as long as the tongue piece projecting ridge is hooked in place inside the cassette opening.

A key is then used to rotate a cylinder lock in the block assembly, so that a lock element engages a slot or hole in the tongue piece, preventing its further movement. The device is made of rigid plastic and stainless steel.

An alternative embodiment does not incorporate a cylinder lock in the block assembly as the locking means. Instead, an external padlock is used to engage one of a number of holes that are cut in the long "T" portion of the tongue piece that protrudes from the front of the transverse block assembly.

The principal object of the present invention is to provide a device that is simple in construction and which may be used to prevent access to the cassette chamber in a cassette tape deck.

Another object of the invention is to provide a security device for a cassette tape deck, or similar equipment, that is readily removed by unlocking a cylinder lock incorporated in the device.

A further object is to provide a device that can use an external padlock to hold the device locked in place and to greatly simplify device construction.

Further objects and advantages of the present invention will become apparent from the study of the following portion of the specification, the claims and the attached drawings.

BRIEF DESCRIPTION OF THE DRAWINGS

FIG. 1 is a front perspective view of the preferred embodiment of the present invention, installed in a cassette tape deck and locked in place;

FIG. 2 is a front perspective view of the preferred embodiment of the present invention, assembled and ready for use;

FIG. 3 is a side elevation view of the assembled device, particularly showing the interaction of the tongue piece that is inserted in the block and bearing against a rearward member;

FIG. 4 is a bottom plan view of the assembled device, particularly showing the slots in the tongue piece and the locking element interaction with one of the slots;

FIG. 5 is a cross-section end elevation view of the block assembly alone, taken across line 5—5 of FIG. 4;

DESCRIPTION OF THE PREFERRED AND ALTERNATE EMBODIMENTS

Figure 6:
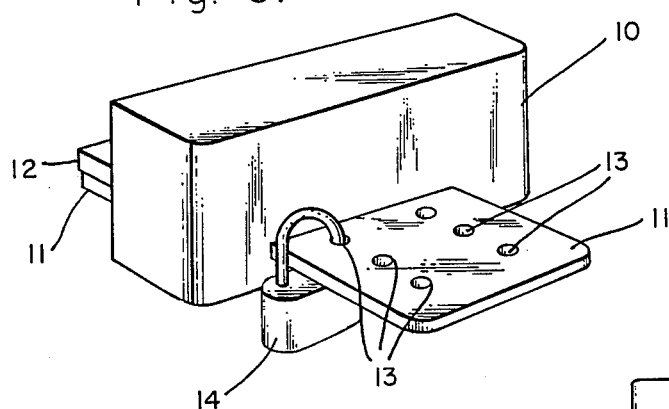
FIG. 6 is a front perspective view of an alternate embodiment of the present invention, showing its use with an external padlock.

Referring particularly to the drawings, there is shown in FIGS. 1 and 2, a preferred embodiment of the present invention. In FIG. 1, the transverse block assembly 2 is shown inserted in a typical cassette tape deck and pushed hard against the outer tape deck panel, covering the cassette access door. The tongue piece 3 is shown projecting through a slot in the block assembly 2 and the cylinder lock 4 has been rotated, locking the tongue piece 3 in place. FIG. 2 shows a perspective of the device assembled and ready for insertion in the tape deck or other similar equipment, such as a CD player or computer disk drive. Also shown is a partial view of the rearward bearing member 7, against which the tongue piece 3 bears. This action is shown more clearly in the side elevation view of FIG. 3. Here, the tongue piece 3 is depicted inserted through the block assembly 2. The overall thickness of the tongue piece 3 plus the rearward bearing member 7, approximates the thickness of a standard cassette or disk slot. This is done so that, when inserted in the equipment, the device will fill the opening space.

The block assembly 2 is comprised of a main transverse block 2.5 to 3 inches wide by 1.3 inches high by 0.75 inches deep and made of rigid plastic, a rearward bearing member 7 which is narrower than the block in width, about 1 inch deep and 0.25 inches thick and made of rigid plastic, and a cylindrical lock 4. These dimensions are for the device when used for a cassette tape deck equipment. When used in a CD player or computer disk drive, the width of the block assembly 2 and the rearward bearing member 7 would be increased to fit the increased width of the CD slot opening or disk drive.

The rearward bearing member 7, which is part of the transverse block assembly 2, projects horizontally outward just above the tongue piece 3, preventing the tongue piece from flexing or bending upward and also filling the cassette opening space. This bearing member 7 may be formed as part of the transverse block assembly 2, or may be a separate part which is attached to the assembly.

In the FIG. 3 view, the projecting ridge 8 that is attached to the back end of the tongue piece 3 is clearly shown in profile. It is the function of the projecting ridge 8 to hook on to the inside surface edge of the cassette opening in the tape deck equipment. A multiplicity of transverse locking slots 5 are cut in the long portion of the "T" in the tongue piece 3 for the purpose of engagement with the locking element. Refer to FIG. 4, which shows a view of the assembled device as seen from the underneath, and FIG. 5 which shows a cross-section of the block assembly alone, taken along line 5—5 of FIG. 4.

The tongue piece 3 which is shaped in a "T," is made of 0.100 inch thick stainless steel or equivalent strength material. The projecting ridge 8 is approximately 2 inches long by 0.25 inches wide by 0.20 inches high and is welded to, or formed to, the surface of the tongue piece 3 top "T" so that it is perpendicular to the long axis of the tongue piece 3. The locking slots 5 are cut parallel with the projecting ridge 8, and located so that they coincide with the locking element clearance slot 9 in the transverse block assembly 2, thus allowing the locking element 6 to be rotated into any one of the locking slots 5. As shown in FIG. 5, a horizontal slot is cut in the block 2 to allow the tongue piece 3 to be inserted in it.

The cylindrical lock 4 is similarly held in the main transverse block 2 by fitting it in a specially bored and relieved hole and fastening with a nut.

With respect to the arrangement where the locking element 6 fits into elongated locking slot 5 cut into the tongue piece 3, a variation could be the use of a line of small holes along the axis of the tongue piece 3 instead of using the slots 5. Instead of the locking element 6 itself projecting into a slot, it could push a floating ball bearing down into one of the holes. When the ball falls into a hole, the locking element that bears against the ball prevents further movement of the tongue piece. Variations such as this, which are a means of locking the tongue piece to the block 2, are considered to be part of this invention.

Referring now to FIG. 6, there is shown an alternate embodiment of the present invention. In this embodiment, the locking means is provided by an external padlock 14, fastened to the tongue piece 11 through a hole 13. Both the transverse block assembly 10 and the tongue piece 11 are constructed similarly to the transverse block assembly 2 and tongue piece 3 described previously. The alternate main block member 10 may be shorter in height than the preferred main block member 2, because there is no need of allowing space for a cylinder lock 4.

Figure 7:
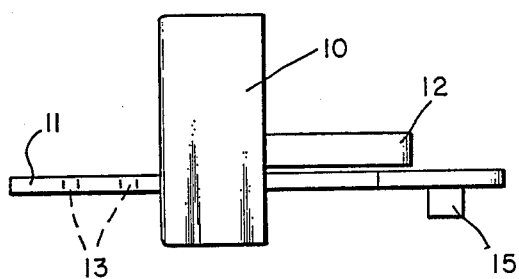
FIG. 7 is a side elevation view of the assembled alternate embodiment of the present invention.
Figure 8:
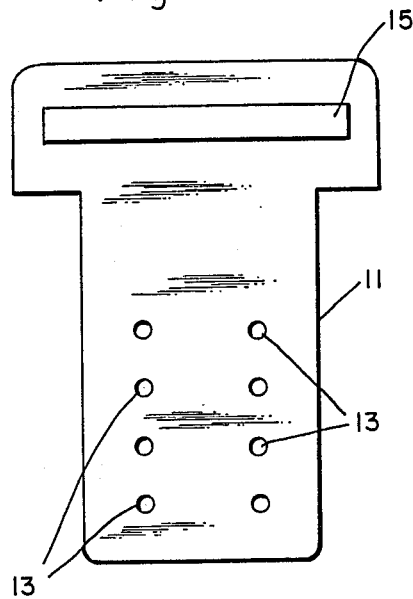
FIG. 8 is a plan view of the tongue piece that is used in the alternate embodiment.

As shown in FIGS. 7 and 8, the alternate tongue piece 11 is identical to the previously described tongue piece except for the use of multiple holes 13 arranged in the long portion of the "T" instead of locking slots 5. The projecting ridge 15 is the same as that described earlier for projecting ridge 8 and performs the same function.

Figure 9:
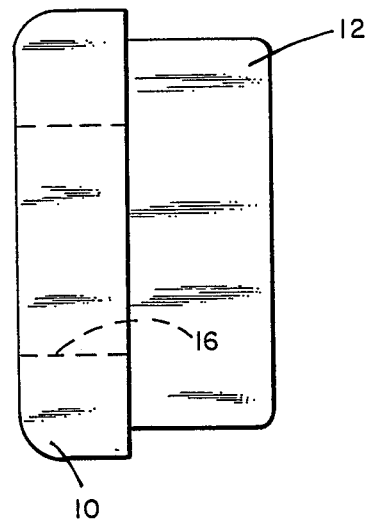
FIG. 9 is a plan view of the alternate block assembly.
Figure 10:
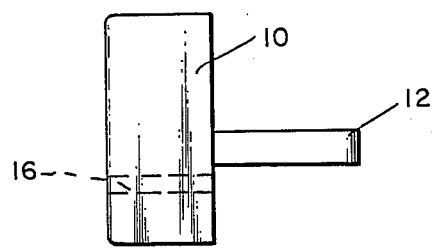
FIG. 10 is a side elevation view of the alternate block assembly, both FIGS. 9 and 10 particularly drawing attention to its simplicity and lack of incorporated mechanisms.

The rearward bearing member 12 shown in FIGS. 9 and 10 is also identical to rearward bearing member 7 and performs the same function. A transverse slot 16 is cut in the block 10 to allow for inserting the tongue piece 11.

Rigid plastic is the material of choice for the block assembly 10 and rearward bearing member 12. Stainless steel 0.100 inches thick is recommended for the tongue piece 11. The use of stainless steel for the tongue piece in this instance, is primarily to provide strength in combatting attempts to break the device. The alternate embodiment of the device uses the same materials as the preferred embodiment.

As can be seen, the alternate embodiment of the device is extremely simple in construction and concept, both embodiments thus achieving the object of the present invention. Other variations of the described embodiments will be apparent to those skilled in the art. These alternatives are considered to be equivalent and within the spirit and scope of the present invention.

Having described the invention, what is claimed is:

1. A security device for cassette tape decks, CD players or the like, for insertion into the cassette chamber opening and for blocking access to said cassette chamber opening, the device comprising:
    (a) a transverse block assembly, and
    (b) a tongue piece; said transverse block assembly further comprising a main transverse block member, a rearward bearing member and a locking means; said main transverse block member being made of a rigid plastic material and sized 2.5 to 5.5 inches wide, depending on device application, and approximately 1.3 inches high by 0.75 inches deep, the rear longitudinal surface of said transverse block being for the purpose of bearing against and blocking access to said cassette chamber opening; said rearward bearing member being attached to, or formed as part of the rear longitudinal surface of said main transverse block member, so that said rearward member projects horizontally outwards, providing a surface against which said tongue piece bears when assembled; said tongue piece being a "T" shaped member made of 0.100 inch thick stainless steel or equivalent strength material, and having a multiplicity of locking slots cut in the long portion of the "T" for the purpose of engagement with a locking element; said tongue piece including a projecting ridge, welded or otherwise attached to the surface of said tongue piece top "T" so that it is perpendicular to the long axis of said tongue piece; said tongue piece thickness and the thickness of said rearward bearing member, together being equal to the thickness of a standard cassette for the purpose of filling the cassette chamber opening; said main transverse block member incorporating a horizontal slot for the purpose of inserting said tongue piece; said tongue piece when inserted in said main transverse block member, and then inserted in a tape deck cassette chamber opening, able to have its projecting ridge bear against the inside surface of said cassette chamber opening, and said main transverse block member bear against the outside surface of said tape deck or similar equipment; said locking means, when motivated, engaging one of said transverse locking slots in said tongue piece, thereby holding the device in place, blocking access to said tape deck cassette chamber, preventing the device removal and unauthorized use of said tape deck or similar equipment.

2. The security device as defined in claim 1, wherein: said locking means includes a metal cylindrical lock having a locking element perpendicular to its main cylindrical axis, and capable of being rotated by a key inserted in said cylindrical lock face; said locking element being sized to interact with and engage a transverse locking slot in said tongue piece.

3. The security device as defined in claim 1, wherein: said rearward bearing member is made of rigid plastic material and is narrower than said main transverse block member in width, its width being sized to fit inside the cassette chamber or CD chamber opening; said rearward bearing member being approximately 1 inch deep and 0.25 inches thick; said rearward bearing member providing a rigid surface that prevents said tongue piece from flexing or bending upward, and together with said tongue piece, filling said cassette chamber so that neither can be removed when locked in place.

4. The security device as defined in claim 1, wherein: said tongue piece locking slots may include a multiplicity of small holes along the axis of said tongue piece, said small holes being sized to seat a ball bearing that bears against said locking element in said locking means, and preventing movement of said tongue piece with respect to said transverse block assembly.

5. The security device as defined in claim 1, wherein: a sufficient length of said tongue piece projects through the front of said transverse block assembly for the purpose of being pulled tight by hand against the inside surface edge of said cassette chamber opening, prior to locking in place.

6. A security device for cassette tape decks, CD players or the like, for insertion into the cassette chamber opening and for blocking access to said cassette chamber opening, the device comprising:
 (a) a transverse block assembly,
 (b) a tongue piece, and
 (c) a locking means;
said transverse block assembly further comprising a main transverse block member and a rearward bearing member; said main transverse block member being made of rigid plastic material and sized 2.5 to 5.5 inches wide, depending on the device application, and approximately 1 inch high by approximately 0.75 inches deep, the rear longitudinal surface of said transverse block being for the purpose of bearing against and blocking access to said cassette door opening; said rearward bearing member being attached to, or formed as part of the rear longitudinal surface of said main transverse block member, so that said rearward member projects horizontally outwards, providing a surface against which said tongue piece bears when assembled; said tongue piece being a "T" shaped member made of 0.100 thick stainless steel or equivalent strength material, and including a projecting ridge, welded or otherwise attached to the surface of said tongue piece top "T," so that it is perpendicular to the long axis of said tongue piece; said main ransverse block member incorporating a horizontal slot for the purpose of inserting said tongue piece; said tongue piece, when inserted in said main transverse block member and then inserted in a tape deck cassette door opening, able to have its projecting ridge bear against the inside surface of said cassette chamber opening; the combined thickness of said tongue piece and said rearward bearing member sized to fill the cassette chamber space; said main transverse block member bearing against the outside surface of said tape deck; said locking means, when motivated, holding said tongue piece in place and preventing the device removal and unauthorized use of the tape deck, CD player or like equipment.

7. The security device as defined in claim 6, wherein: said locking means includes an external padlock cooperating with a multiplicity of holes that are cut in the long portion of the "T" of said tongue piece.

8. The security device as defined in claim 6, wherein: said rearward bearing member is made of rigid plastic material and is narrower than said main transverse block member in width, its width being sized to fit in the cassette chamber opening or CD player opening or similar equipment, and being approximately 1 inch deep and 0.25 inches thick; said rearward bearing member providing a rigid surface that prevents said tongue piece from flexing or bending upward.

9. The security device as defined in claim 6, wherein: a sufficient length of said tongue piece projects through the front of said transverse block assembly for the purpose of being pulled tight by hand against the inside surface of said cassette chamber opening, prior to locking in place.

* * * * *